Oct. 27, 1959     T. F. SHARP     2,909,938
DRIVE CHAIN
Filed Aug. 9, 1956     3 Sheets-Sheet 1
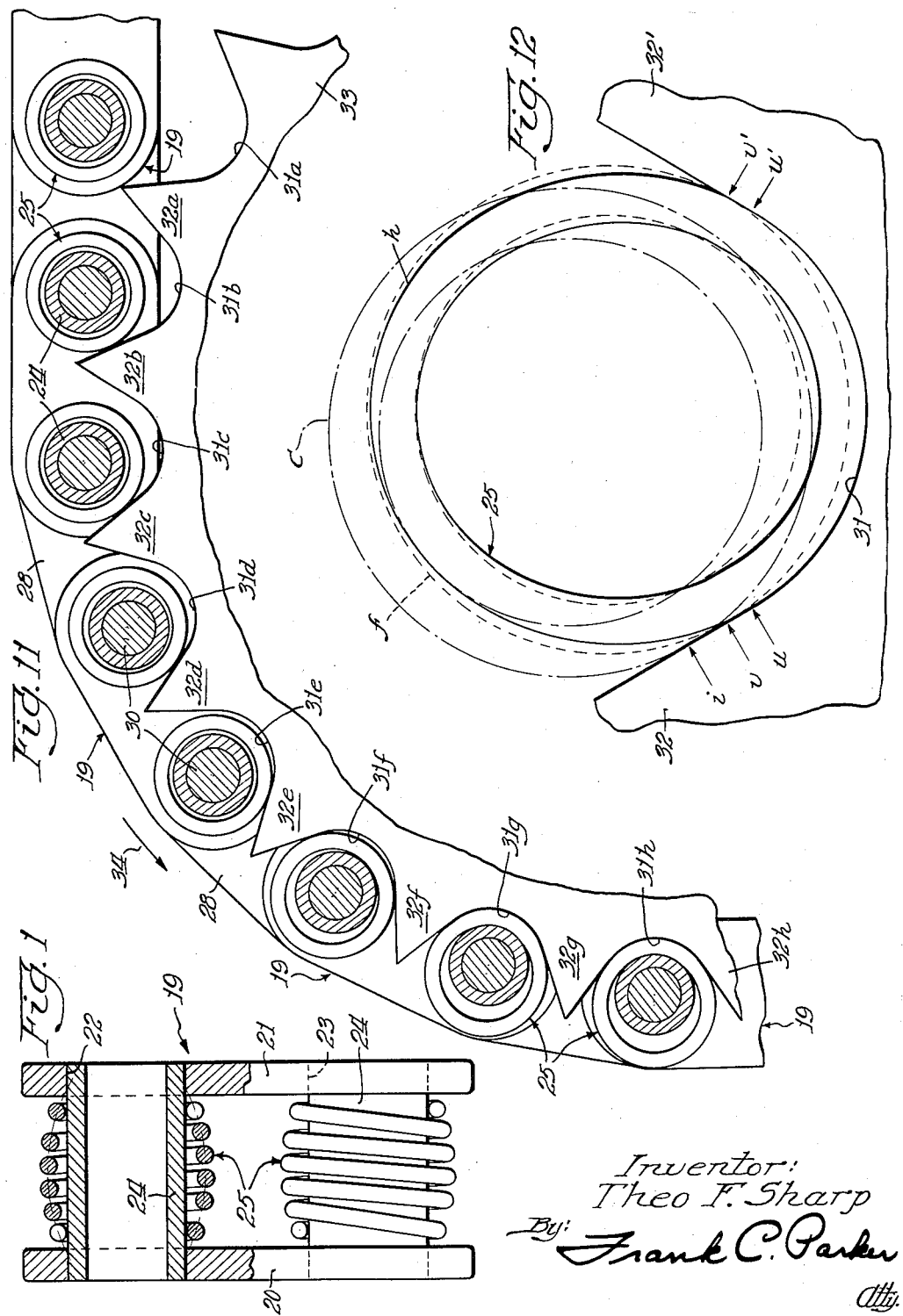
Inventor:
Theo F. Sharp
By: Frank C. Parker
Atty.

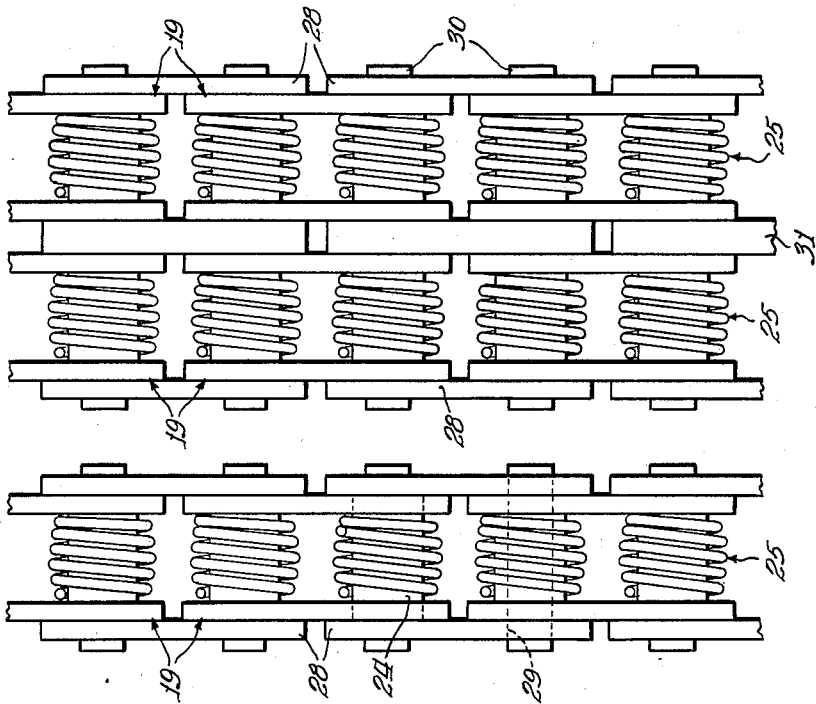
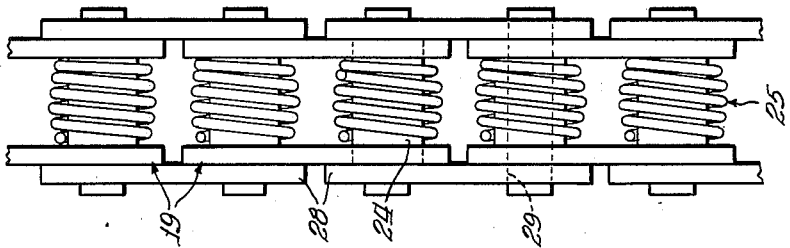
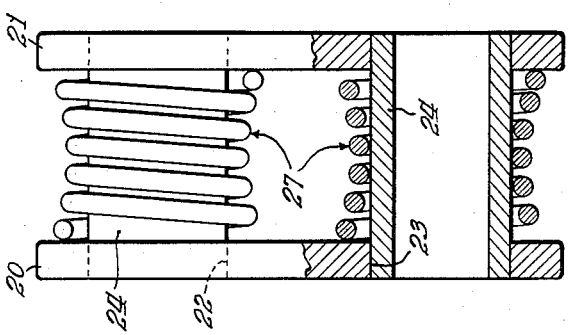
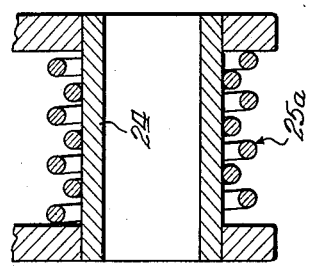
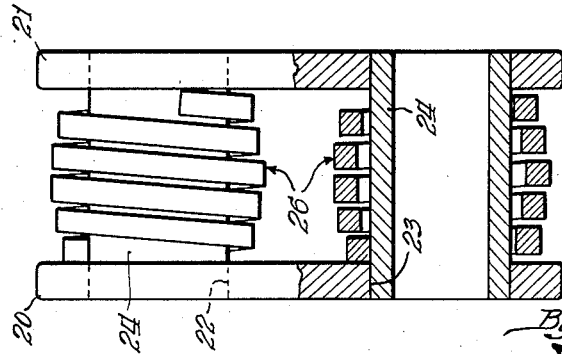

Oct. 27, 1959 T. F. SHARP 2,909,938
DRIVE CHAIN
Filed Aug. 9, 1956 3 Sheets-Sheet 3
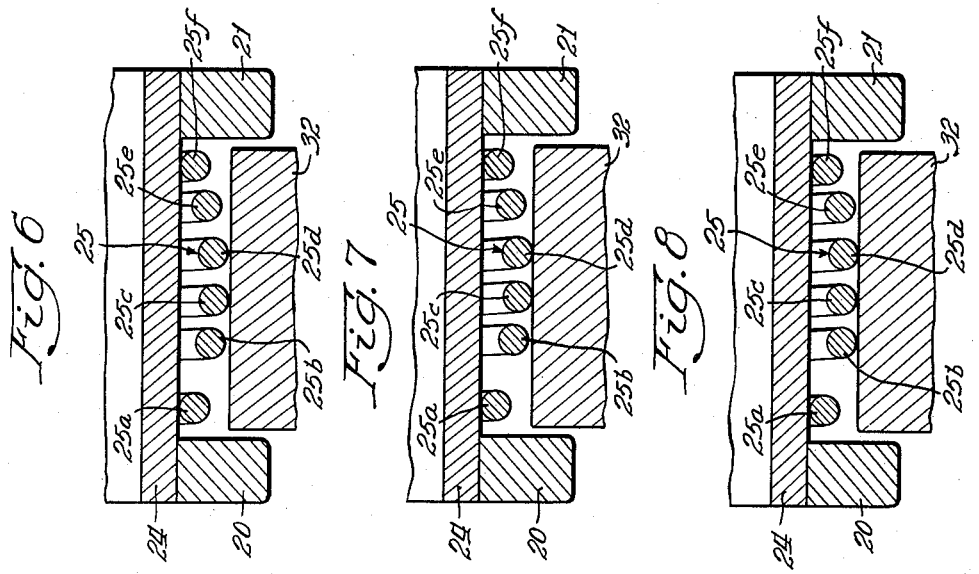
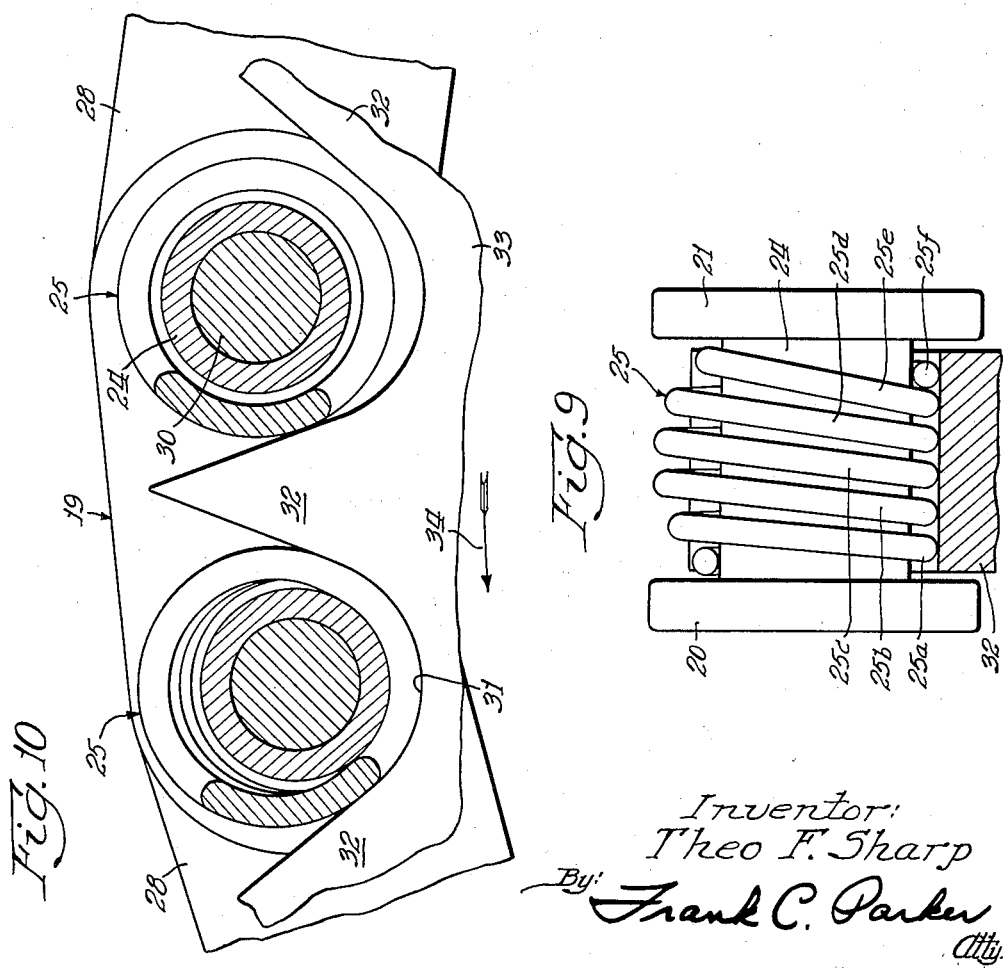
Inventor:
Theo F. Sharp
By: Frank C. Parker
Atty.

United States Patent Office 2,909,938
Patented Oct. 27, 1959

2,909,938

DRIVE CHAIN

Theo F. Sharp, Ithaca, N.Y., assignor to Morse Chain Company, Ithaca, N.Y., a corporation of New York Application August 9, 1956, Serial No. 602,973

5 Claims. (Cl. 74—256)

The present invention relates in general to chain drive power transmissions and more particularly to those types of chain drives wherein silent operation is a requirement.

The principal object of the present invention is to provide a driving chain or timing chain generally of the roller type, but which is capable of transmitting loads of the magnitude ordinarily transmitted by roller chains and which is also simultaneously capable of operating far more silently than has heretofore been the case with conventional roller chains.

It is generally recognized that a disadvantage of roller chains, particularly when they are used as timing chains for automobile engines, arises from the fact that they generate a whine when in operation, which is objectionable to passengers in the automobile inasmuch as this whine is transmitted back into the passenger compartment. It is therefore essential, if the advantages of roller chains are to be enjoyed for this application, that the noise ordinarily accompanying roller chains when they are operating at relatively high speeds, be substantially minimized.

The present invention therefore contemplates the use of roller means for a roller chain of a resilient construction capable of deformation and distortion upon progressive seating of the chain on its associated sprocket so as to dissipate the seating impact energy partially in the form of potential energy stored in the spring and partially as a multiplicity of low amplitude metal-to-metal impacts and partially as friction energy dissipation.

A more specific object of the present invention is to provide roller means for a roller drive chain comprising helical spring rollers adapted to be matingly seated within the tooth gaps of the associated sprocket and wherein the convolutions of the helical spring rollers are of different sizes so that the larger size spring convolutions initially engage the adjacent sprocket teeth during rotation of the sprocket and the successively smaller convolutions thereafter successively engage the adjacent sprocket teeth, with each of the convolutions progressively deforming and distorting until the roller means become fully seated within the respective tooth gaps of the sprocket.

For the purpose of illustration and in order to better disclose the scope of the present invention, several different embodiments have been shown wherein the helically coiled spring roller means are in some instances of convex or barrel shaped configuration with the medial convolutions being of the greatest diameter and other forms are shown as being concave or hour glass shaped wherein the medial convolutions have the smallest diameter. The present invention is also intended to encompass any other arrangement in which some of the convolutions fit the bushing and some convolutions have a greater outside diameter than the tooth gap seating curve of the sprocket.

With the foregoing objects and advantages in mind, the invention will be better understood and further objects and advantages thereof will become apparent when the following detailed description is read in conjunction with the accompanying drawings, wherein;

Fig. 1 discloses a drive chain link formed in accordance with, and including the features of one embodiment of, the present invention;

Fig. 2 is a view similar to Fig. 1 and showing a drive chain link incorporating a helically coiled spring roller of somewhat modified construction;

Fig. 3 is another view similar to Fig. 1 and illustrating a still further modification of the spring roller means of the present invention;

Fig. 4 is a fragmentary plan view of a drive chain incorporating the roller means shown in Fig. 1 and wherein there is but a single row of chain links respectively interconnected for relative articulation by means of connecting plates on either side of the links;

Fig. 5 is a view similar to Fig. 4 and illustrates that the present improved helically coiled spring roller means may be used just as well in drive chains comprising more than one row of chain links;

Figs. 6, 7 and 8 are fragmentary sectional views illustrating the successive engagement of the helically coiled spring convolutions as the chain becomes matingly seated in the sprocket tooth gaps during rotation of the sprocket;

Fig. 9 is a view similar to Figs. 6, 7 and 8, but showing the helically coiled spring in plan view and illustrating how the spring is distorted when the coiled spring roller is fully seated within its associated sprocket tooth gap;

Fig. 10 illustrates the distortion of the spring rollers as they become seated within their associated sprocket tooth gaps;

Fig. 11 is a view similar to Fig. 10 and is slightly exaggerated in order to better illustrate the progressive deformation and distortion of the spring roller during seating engagement thereof in the sprocket tooth gaps and illustrating the fact that seating action takes place simultaneously in a plurality of tooth gaps;

Fig. 12 illustrates that from the point of initial contact of the helically coiled spring roller with its associated sprocket tooth, there is first a rolling friction and thereafter, until full seating of the roller becomes effected, there is a sliding friction between the roller and sprocket tooth gaps; and Fig. 13 illustrates another embodiment of the spring roller means wherein alternate convolutions have relatively large and small diameters.

With reference now to the drawings, wherein like reference numerals have been used in the different views in order to identify identical parts, the improved drive chain link designated by reference numeral 19 in Fig. 1 will first be described. The drive chain link 19 comprises a pair of laterally spaced link plates 20 and 21. Each of the link plates 20 and 21 is provided with a pair of longitudinally spaced laterally extending apertures 22 and 23. The opposed apertures 22 are substantially aligned with each other while the opposed apertures 23 are also aligned with each other. Suitable substantially cylindrically shaped bushing means 24 preferably are snugly received within the respective aligned openings and perform the function of maintaining the link plates 20 and 21 and bushing means 24 in assembly with each other. The bushing means 24 may be of conventional form as may also the link plates 20 and 21.

Substantially concentrically mounted around each of the bushing means 24 are helically coiled spring rollers formed of a metal wire, of substantially round cross section, indicated generally by reference numeral 25. Each of the spring rollers 25 comprises a plurality of convolutions, and in the embodiment shown in Fig. 1, the medial convolutions are of greater diameter than the convolutions at either end, as is clearly shown in Fig. 1. It is thus seen that the spring rollers 25 are of convex or barrel shape.

The drive chain link shown in Fig. 2 is similar in all respects to the links shown in Fig. 1 except that the helically coiled spring rollers are of square or rectangular cross section and these spring rollers, for the purpose of distinction, are designated by reference numerals 26. It will be understood that the spring rollers may be of any other desired cross section.

Fig. 3 shows a further modification of the spring rollers, the drive chain link being otherwise identical with that shown in Fig. 1, and in Fig. 3 the spring rollers are comprised of substantially round cross section wire and the medial convolutions are of the smallest diameter with the end convolutions being of the greatest diameter. For the purpose of distinguishing between the rollers 25 and 26 respectively shown in Figs. 1 and 2, the helically coiled spring rollers in Fig. 3 are designated by reference numeral 27.

Fig. 13 shows a further modification of the spring roller means wherein the spring roller 25a comprises alternate relatively large and small convolutions.

Fig. 4 discloses a section of drive chain comprising a plurality of drive chain links 19 respectively connected together by means of a plurality of connecting plates 28. Each of the connecting plates 28 is provided with spaced apertures 29 and when the apertures 29 are aligned with the interiors of the bushings 24, suitable pins 30 extend through the apertures 29 and through the bushings 24 in order to connect the connecting plates 28 and chain links 19 together for relative articulation. The drive chain disclosed in Fig. 4 comprises a single row of chain links 19 and it is contemplated that this arrangement will be utilized wherever a single row of links is capable of transmitting the required amount of torque.

For those applications where the horsepower loads or speeds require more than a single row of chain links 19, the chain may be formed, as suggested in Fig. 5, with two rows of links 19 being disposed in alignment with each other and with the connecting pins 30 extending through connecting plates 28 on the outside of the chain and through thickened connecting plates 31 disposed between the adjacent rows of links 19. Inasmuch as the connecting plates 31 function to retain both rows of links 19 in assembly, it is necessary that they be thicker than the connecting plates 28. It will be understood that, if desired, the thick connecting plates 31 may be replaced by two adjacent thin plates 28 or two thinner center plates. In order to handle even greater horsepower loads or speeds than the type of chain disclosed in Fig. 5 can handle, it is contemplated that any desired number of rows of chain links can be assembled in a single chain in the manner suggested by Fig. 5.

It will be noted that the spring rollers shown in the chains illustrated in both Figs. 4 and 5 are similar to rollers 25 shown in Fig. 1, that is, the rollers are of convex or barrel shape and are made of wire of a substantially round cross section. It will be understood that Figs. 4 and 5 are merely illustrative and it is only essential for purposes of the present invention that the rollers comprise helically coiled springs wherein the convolutions are of varying sizes.

Having thus described the structural features of the improved drive chain and drive chain links comprising the subject matter of the present invention, the operation thereof will now be described with particular reference to Figs. 6–12.

Referring first to Fig. 11 which shows the seating of the chain within the tooth gaps 31a–31h respectively positioned between successive sprocket teeth 32a–32h of sprocket 33, the largest convolutions of the helically coiled spring rollers 25 initially engage the sprocket teeth 32 and, upon further rotation of the sprocket 33 and advance of the chain around the sprocket in a counter clockwise direction, as indicated by arrow 34, the convolutions distort and become gradually seated in the tooth gaps 31a–31h.

With reference to Figs. 6–9, it will be seen how in Fig. 6, which represents the initial engagement of the helical spring 25 with the sprocket tooth 32, the medial spring convolution 25c initially engages the tooth 32. As the chain progresses around the sprocket 33 the roller becomes further seated into the tooth gap and convotion 25d is by this time disposed in engagement with the tooth 32. Upon further progression of the chain around the sprocket, the rollers 25 become seated still further, until in Fig. 8, all three convolutions 25b, 25c and 25d are disposed in engagement with sprocket tooth 32. Fig. 9 represents the condition where the spring roller 25 is completely seated within the sprocket tooth gap and all of the convolutions 25a–25f are disposed in engagement with the tooth 32.

Fig. 10 shows how the spring roller 25 initially engages the tooth 32 and how, as the sprocket 33 rotates further in a counter clockwise direction, the spring roller 25 gradually becomes seated within the tooth gap 31. The progressive deformation and distortion of the successive spring rollers in the chain during engagement of the respective spring rollers, while they are being seated within the tooth gaps, is sufficiently gradual so that seating action of two or more of the rollers 25 occurs simultaneously. In other words, rather than the roller striking the tooth and becoming seated with substantially a single hard impact, the rollers 25 initially engage the tooth and due to the resilience of the rollers, they distort and cushion the impact and thus substantially minimize the noise that would otherwise be created.

The action of the rollers 25 during seating engagement within the associated tooth gaps can best be understood by a more thorough consideration of Fig. 11 which shows a number of rollers in successive positions between initial engagement and full engagement. In order to more clearly illustrate the action which takes place while a roller 25 becomes seated within a tooth gap, the action in Fig. 11 is possibly somewhat exaggerated and protracted over a somewhat greater angular portion of the sprocket 33 than actually takes place, the amount of protraction being dependent upon the magnitude of the load, greater loads would shorten the angular portion of the sprocket involved in the gradual seating.

In Fig. 11, it will be assumed that the sprocket 33 is rotating in a counter clockwise direction as indicated by the reference arrow 34 and that the sprocket 33 is driving the chain in this direction. By successively considering the rollers 25, beginning with the roller which is just in engagement with the side of tooth 32b, and by proceeding counter clockwise therefrom to the roller which is fully seated within gap 31h, the full action of each of the rollers will be understood.

The roller 25 which is just engaging tooth 32b is shown at the point of initial engagement of the roller with the tooth. Probably only a single convolution of the roller 25 will be in engagement with the tooth 32b, similar to the condition shown in Fig. 6. As the chain progresses further in a counter clockwise direction or by considering the next roller 25, which is in engagement with tooth 32c, it will be seen that this roller has rotated slightly in a counter clockwise direction around its bushing 24 and possibly two convolutions of the roller 25 will be in engagement with the tooth 32c, such as is shown in Fig. 7. The next roller 25, proceeding in a counter clockwise direction, is disposed even further within the tooth gap 31e while the roller 25 within the gap 31f is sufficiently seated to engage the forward face of tooth 32d. The roller 25 positioned in gap 32f is in engagement with both teeth 32f and 32e and thus the distortion of the convolutions from this position to the position of full engagement, which is represented by the roller 25 disposed in gap 31h, is not only a distortion in a single direction but is a distortion which tends to reshape the convolutions to an egg shape or out-of-round.

With reference particularly to Fig. 12, the alternately dotted and dashed lines designated by reference character *c* correspond quite closely with the position of the spring roller convolution, shown in Fig. 11 to be in contact with the reverse face of tooth 32*c*. It will be noted that when the roller assumes position *c* it engages the tooth 32 at point *i*. Upon further advance of the sprocket and chain, the roller 25 becomes further seated within gap 31 and when the roller reaches the angular position designated substantially by the roller disposed in gap 31*f*, in Fig. 11, the dotted lines *f* correspond to the configuration of the roller 25 and the roller, at this time, engages both teeth 32 and 32′ respectively at points *v* and *v*′. When the roller goes from the position designated by character *f* to the position of full seating, represented by the roller within gap 31*h*, in Fig. 11, and represented by character *h* in Fig. 12, it is in sliding contact with both teeth 32 and 32′ respectively, from points *v*—*v*′ to points *u*—*u*′ and thenceforth in the travel of the roller around the sprocket it remains substantially fully seated within gap 31.

Inasmuch as the convolution of the spring engages only the one tooth 32 at point *i*, the roller actually rotates slightly clockwise, relative to the surface of tooth 32, until it contacts the teeth 32 and 32′ at points *v*—*v*′. During this portion of the seating, the seating impact energy is consumed by rolling friction and only a slight amount of noise is created due to the resilient impact of the convolutions of the roller with the tooth 32 at point *i*. From the points of contact *v*—*v*′ to the position of full seating, the roller slides along both teeth 32 and 32′ and thus a portion of the seating impact energy is consumed by sliding friction. Inasmuch as the convolutions distort from the position of initial engagement with a single tooth to the position of full seating engagement, the convolutions themselves absorb a portion of the seating impact energy in the form of potential energy stored in the spring which is released substantially silently upon withdrawal of the convolutions of the spring from the sprocket teeth as the roller leaves the sprocket.

The seating impact energy which is converted into potential energy stored in the spring is substantially noiseless and this, of itself, serves to considerably minimize the noise produced by the chain during operation. In addition, the seating impact energy which is converted to rolling friction and sliding friction is likewise not available for the production of sound. Inasmuch as the complete seating of the spring rollers takes place during several tooth gaps simultaneously and over several spring rollers, rather than being concentrated in one tooth gap and on one roller, as is the case with conventional cylindrical rollers, the chain and sprocket function less noisily. Further, the angle of incidence at the point of contact is smaller with the improved spring roller disclosed herein than with a conventional cylindrical roller and this tends to reduce the normal velocity component of energy transfer.

In the description of the operation of the chain in connection with Figs. 11 and 12, little or no mention has been made of the fact that there is more than one convolution available for absorbing the seating impact energy. When it is realized that each of the spring convolutions functions as described in connection with Fig. 12 it will be even more clearly understood how the present chain functions to minimize the noise or whine which normally accompanies the operation of a sprocket and roller chain. In other words, each convolution initially engages one tooth at a single point but this initial engagement of all of the convolutions of a single roller, when the convolutions are of varying sizes, will never be simultaneous but will, rather, take place over some finite angular distance so that the initial impact of the spring roller comprises a relatively small impact followed successively by other small impacts as the successively smaller convolutions successively engage the sprocket tooth. Likewise, the deformation and distortion of the successively smaller convolutions of any one roller is not simultaneous but is a progressive action. As a result, the net effect is that the chain functions far more silently than a conventional roller chain and tests of operating models of this type of chain have even shown that the chain functions as silently as conventional "silent chain."

It is believed that one of the principal reasons that the present chain functions so much more satisfactorily from a noise standpoint than conventional roller chain, or even roller chains wherein the rollers comprise helically coiled spring convolutions of substantially the same diameter, is due to the fact that the different sized convolutions enable the spreading out of the seating function of the rollers within the tooth gaps and, therefore, it is considered important that the spring convolutions be of different size. It is not deemed an absolute necessity that the rollers be symmetrical, that is, that the outside convolutions be of the same diameter but it is deemed essential that the convolutions be of different size. It is also important that some of the convolutions of the spring fit the bushing and that some of them have an outside diameter greater than the tooth gap seating curve of the sprocket (radius of the root or bottom of the sprocket tooth gap). In addition, by spreading the engagement (chain to sprocket) over several teeth the length of time to seat each roller is increased, and thus the magnitude of impact is reduced, thereby resulting directly in lower amplified elastic vibrations in the contacting metal surfaces, and, in turn, lower amplified sound waves. Further, it will be understood that the silencing characteristics attributable to the present type of chain are not effected by the cross sectional shape of the wire forming the rollers and therefore any desired cross sectional wire shape is considered to come within the purview of the present invention.

It is contemplated that numerous changes and modifications may be made in the present invention without departing from the spirit or scope thereof.

What is claimed is:

1. A drive chain link comprising laterally spaced link plates, said link plates each including means defining substantially aligned apertures, connecting means respectively disposed within said aligned apertures in said laterally spaced link plates for maintaining said spaced link plates in assembly with each other, and roller means disposed around the respective connecting means and each comprising a helically coiled spring consisting of a plurality of convolutions of varying diameters whereby the convolutions of varying diameters of each spring are adapted to successively engage a member driving said chain link to thereby tend to silence the drive.

2. A drive chain link comprising laterally spaced link plates, said link plates each including means defining substantially aligned apertures, cylindrical bushing means respectively disposed within said aligned apertures in said laterally spaced link plates for maintaining said spaced link plates in assembly with each other, and roller means disposed around the respective bushing means and each comprising a helically coiled spring consisting of a plurality of convolutions of varying diameters whereby the convolutions of varying diameters of each spring are adapted to successively engage a member driving said chain link to thereby tend to silence the drive.

3. A chain drive comprising a rotatable toothed sprocket having alternately spaced teeth and tooth gaps disposed around the periphery thereof and a chain comprising a plurality of spaced links joined together for relative articulation, each of said links including roller means respectively adapted to be matingly seated within said sprocket tooth gaps, and said roller means each comprising a helically coiled spring having different sized convolutions the largest of said convolutions having a radius of curvature greater than the radius of curvature of the tooth gaps, whereby said convolutions successively and progressively engage an adjacent sprocket tooth during rotation of the sprocket to thus effect gradual seating of the roller means within the sprocket tooth gaps so as to thereby tend to silence the drive.

4. A chain drive comprising a rotatable toothed sprocket having alternately spaced teeth and tooth gaps disposed around the periphery thereof and a chain comprising a plurality of spaced links joined together for relative articulation, each of said links including roller means respectively adapted to be matingly seated within said sprocket tooth gaps, and said roller means each comprising a helically coiled spring having different sized convolutions, whereby upon entry of the successive roller means into mating sprocket tooth gaps during rotation of the sprocket the larger sized spring convolutions initially engage the adjacent sprocket teeth and the successively smaller convolutions thereafter successively engage the adjacent sprocket teeth, with each of the convolutions progressively deforming and distorting until the roller means become fully seated within the respective tooth gaps so as to thereby tend to silence the drive.

5. A chain drive comprising a rotatable toothed sprocket having alternately spaced teeth and tooth gaps disposed around the periphery thereof and a chain comprising a plurality of spaced links joined together for relative articulation, each of said links including a pair of spaced link plates respectively formed with means defining substantially aligned laterally extending apertures at either end thereof, cylindrical bushing means respectively disposed within each pair of spaced link plates for maintaining the spaced link plates in assembly with each other, each of said links including roller means respectively adapted to be matingly seated within said sprocket tooth gaps, and said roller means each comprising a helically coiled spring having different sized convolutions, whereby upon entry of the successive roller means into mating sprocket tooth gaps during rotation of the sprocket the larger sized spring convolutions initially engage the adjacent sprocket teeth, with each of the convolutions progressively deforming and distorting until the roller means become fully seated within the respective tooth gaps so as to thereby tend to silence the drive.

References Cited in the file of this patent

UNITED STATES PATENTS

| | | |
|---|---|---|
| 985,518 | Elers | Feb. 28, 1911 |
| 1,264,742 | Aldrich | Apr. 30, 1918 |
| 1,894,600 | Schmidt | Jan. 17, 1933 |
| 2,212,907 | Weiss | Aug. 27, 1940 |
| 2,458,682 | Couper | Jan. 11, 1949 |

FOREIGN PATENTS

| | | |
|---|---|---|
| 771,366 | France | July 23, 1934 |